United States Patent [19]
Young

[11] 4,445,925
[45] May 1, 1984

[54] METHODS OF PRODUCING CONCENTRATED UREA-SULFURIC ACID REACTION PRODUCTS

[75] Inventor: Donald C. Young, Fullerton, Calif.

[73] Assignee: Union Oil Company of California, Los Angeles, Calif.

[21] Appl. No.: 318,629

[22] Filed: Nov. 5, 1981

[51] Int. Cl.$^3$ .............................................. C05C 9/00
[52] U.S. Cl. .................................... 71/28; 71/64.08; 71/64.10; 564/39; 564/73
[58] Field of Search ............................. 71/11, 27–30, 71/40, 43, 64.08, 64.09, 64.10; 564/39, 63, 73, 75

[56] References Cited

U.S. PATENT DOCUMENTS

| | | | |
|---|---|---|---|
| 1,340,708 | 5/1920 | Fjellanger | 71/28 |
| 1,884,105 | 10/1932 | Moore | 423/549 |
| 3,241,946 | 3/1966 | Young | 71/43 |
| 3,459,499 | 8/1969 | Mullen, Jr. | 423/313 |
| 3,649,175 | 3/1972 | Legal, Jr. | 23/107 |
| 3,949,058 | 4/1976 | Young et al. | 423/313 |
| 4,011,300 | 3/1977 | Harbolt et al. | 423/313 |
| 4,011,301 | 3/1977 | Young | 423/313 |
| 4,116,664 | 9/1978 | Jones | 71/29 |
| 4,310,343 | 1/1982 | Verdegoal et al. | 564/63 X |
| 4,315,763 | 2/1982 | Stoller et al. | 71/29 |

OTHER PUBLICATIONS

"Solubility in the System Urea-Phosphoric Acid-Water", Kaganskii, Mukhlya, Kharlamova, and Naumov, Zhurnal Prikiadnoi Khimii, (Russian Technical Journal), vol. 37, No. 5, pp. 1111–1116, May, 1964, original article submitted Sep. 2, 1963, published in the Journal of Applied Chemistry of the U.S.S.R., vol. 39, No. 5, 1964.
"Solubility Polytherm for the System $CO(NH_2)_2$—$H_3PO_4$—$H_2O$", Nurakhmetov, Beremzhanov, and Khanapin, Zhurnal Prikladnoi Khimii (Russian Journal), vol. 46, No. 11, pp. 2405–2408 (sic), Nov. 1973, original article submitted 2-22-71, translated by Plenum Publishing Corp., New York, N.Y.
"Influence of Impurities in Wet-Process Phosphoric Acid on Solubility in the System $CO(NH_2)_2$—$H_3PO_4$—$H_2O$", Vidzhesingkh, Kuznetsova, Torocheshnikov, and Kozlova, Zhurnal Prikladnoi Khimii, (Russian Journal), vol. 49, No. 9, pp. 2074–2075, Sep. 1976; originally submitted Nov. 1975; translated by Plenum Publishing Corp., New York, N.Y.
D. F. du Toit, Verslag Akad. Wetenschappen, 22, 573–574 (abstracted in Chemical Abstracts, 8, 2346, 1914).
L. H. Dalman, "Ternary Systems of Urea and Acids, I. Urea, Nitric Acid and Water, II. Urea, Sulfuric Acid and Water, III. Urea, Oxalic Acid and Water"; JACS, 56, 549–553 (1934).
Sulfur Institute Bulletin No. 10 (1964), "Adding Plant Nutrient Sulfur to Fertilizer".
William Lohry, "Techniques of Manufacturing Hot Mix Suspensions", National Fertilizers Association "Round-Up Papers," (1968), pp. 34–38.

*Primary Examiner*—Ferris H. Lander
*Attorney, Agent, or Firm*—Dean Sandford; Gregory F. Wirzbicki; Michael H. Laird

[57] ABSTRACT

Stable concentrated solutions of urea and sulfuric acid containing mono- and/or diurea sulfates and less than 35 weight percent water, free of sulfamic acid and/or ammonium sulfamate, are produced by a unique process that involves the simultaneous and separate addition of urea, sulfuric acid and optionally water to a reaction zone at controlled rates and in stochiometric proportions equivalent to the composition of the desired product, and maintaining reaction temperatures below the incipient decomposition temperature for the particular composition. The heat generated by the highly exothermic reaction can be removed by cooling the liquid phase during the course of the reaction by direct air heat exchange with only nominal, if any, atmospheric emissions.

52 Claims, 6 Drawing Figures

STATIC CORROSION OF MILD STEEL BY UREA-SULFURIC ACID FORMULATION AS A FUNCTION OF TEMPERATURE

EFFECT OF TEMPERATURE AND REACTION MEDIUM ON THE RATE CONSTANT, k, FOR REACTION OF PRILLED UREA

EFFECT OF TEMPERATURE AND REACTION MEDIUM ON THE RATE CONSTANT, k, FOR REACTION OF GRANULAR UREA

METHODS OF PRODUCING CONCENTRATED UREA-SULFURIC ACID REACTION PRODUCTS

BACKGROUND OF THE INVENTION

1. Field of the Invention

This invention relates to the field of urea-sulfuric acid compositions, and particularly to improved methods of producing stable, highly concentrated urea-sulfuric acid compositions which are useful in a variety of applications. The methods allow sufficient control of reaction parameters to consistently maintain a predetermined product composition and crystallization temperature while avoiding incipient product and/or reactant decomposition and potentially explosive autocatalytic decomposition associated with the highly exothermic reaction. The invention also relates to a unique direct air heat exchange process for cooling the reacting liquid phase without significant emissions to the atmosphere.

2. Description of the Prior Art

Urea is widely used as a topical, sub-surface and foliar fertilizer. Sulfuric acid has also been widely used in the agricultural industry and in other industries for numerous purposes. It is known to be highly corrosive both to metals and animal tissue, including human skin. In the agricultural industry, sulfuric acid has been used as a soil adjuvant, a water penetration improving agent, a herbicide for a wide variety of undesired vegetation, and as a selective herbicide on resistant crops such as onions and garlic.

Previous investigators have observed that urea, sulfuric acid and water can be reacted to form solutions containing mono- and diurea sulfates. This reaction is so exothermic, that it is difficult to control reaction temperature in large volume production plants and it is essentially impossible to control reaction temperature during formulation of the higher acid content compositions, e.g., where the ratio of sulfuric acid to urea is about 1 or greater, with available methods. Furthermore, previous investigators did not recognize either the magnitude or importance of incipient product and/or reactant decomposition or the temperatures at which such decomposition occurs for products having different urea/sulfuric acid ratios. Their methods were not adequate to avoid incipient decomposition, particularly in the higher acid compositions, and they did not recognize the effect of such decomposition on process control or product quality.

D. F. du Toit found that urea formed certain compounds with oxalic, acetic, hydrochloric, nitric and sulfuric acids, and that the resulting compounds were stable in contact with their solutions at 20° C. Verslag Akad. Wetenschappen, 22, 573-4 (abstracted in Chemical Abstracts, 8, 2346, 1914).

L. H. Dalman expanded on du Toit's work by developing the phase relationships between the solid phase and saturated solutions at 10° C. (50° F.) and 25° C. (77° F.) but, as in the case of du Toit, did not develop or disclose methods capable of handling the high heat of reaction involved in large scale industrial processing. "Ternary Systems of Urea and Acids. I. Urea, Nitric Acid and Water. II. Urea, Sulfuric Acid and Water. III. Urea, Oxalic Acid and Water"; JACS 56, 549-53 (1934)

In the article "Adding Plant Nutrient Sulfur to Fertlizer," Sulfur Institute Bulletin No. 10 (1964), the Sulfur Institute discussed the addition of nutrient sulfur to fertilizers and mentioned that urea reacts with sulfuric acid to form two complexes of urea sulfate which are useful fertilizers.

Jones, U.S. Pat. No. 4,116,664 discloses what is referred to therein as a tortuous, multistage process of producing combinations of urea and sulfuric acid in which portions of the sulfuric acid are incrementally added to and reacted with the total amount of urea to be reacted in each of several stages until the total amount of sulfuric acid has been reacted with the urea. The resulting product is unstable and requires further processing. Jones preferably adds water later as required to obtain stability and the desired composition. He discloses that the reaction can be carried out at temperatures of 100° to 225° F. and that if the sulfuric acid is added to the total amount of urea at a rate which is too fast, the temperature goes to about 200° to 225° F. and that a gas is emitted that causes changes in product characteristics such as solidification. The patent states that temperatures of 160° to 200° F. are preferred.

Other writers have discussed methods for controlling the heat of reaction in highly exothermic systems such as the urea-sulfuric acid reaction described by du Toit, Dalman and Jones. For instance, William Lohry, in "Techniques of Manufacturing Hot Mix Suspensions," National Fertilizers Solutions Association "Round-Up Papers," pages 34–38 (1968), disclosed that the exothermic heat of reaction of ammonia with concentrated phosphoric acid can be controlled by either internal or external cooling of the reactants in the reaction vessel, and that it is usually desirable to provide a heel of reaction product in the vessel before adding reactants to prevent drastic variations in product pH.

In U.S. Pat. No. 1,884,105, H. C. Moore disclosed a method for producing salts of sulfuric acid, e.g., by reacting concentrated sulfuric acid with liquid anhydrous ammonia, in which control of the highly exothermic reaction is assisted by adding an initial inventory of product to the reaction zone before reactant addition. In Moore's process, the total amount of sulfuric acid to be reacted is mixed with a quantity of ammonium sulfate previously produced and that mixture is then reacted with liquid anhydrous ammonia.

Similarly, in U.S. Pat. No. 3,459,499, G. C. Mullen, Jr. disclosed a process for ammoniating superphosphoric acid in which, according to Mullen, temperatures are effectively controlled, and diminished product quality associated with excessive reaction temperatures is avoided, in part, by adding a large body of ammonium phosphate product solution to the reaction zone followed sequentially by the introduction of the relatively small quantities of ammoniating fluid and phosphoric acid.

Although these investigators disclosed several characteristics of urea-sulfate combinations, methods of making those combinations and, in general, methods of controlling exothermic reactions, they did not recognize either the magnitude or significance of the incipient decomposition temperature in large volumes of reacting urea and sulfuric acid in the presence of reacted urea-sulfate. Nor did they appreciate that incipient decomposition temperature varies with the urea-sulfate composition, i.e., with the ratio of urea, sulfuric acid and water in the reaction phase, or the effect that exceeding the incipient decomposition temperature has on product composition. They also did not devise or appreciate the need for process conditions required to achieve acceptable reaction rates in large volumes of reacting urea and sulfuric acid while preventing either gross or localized overheating to temperatures in excess of the incipient decomposition temperature. Nor did they recognize several characteristics of urea-sulfuric acid reaction products that make them particularly attractive for certain utilities.

It is therefore one object of this invention to provide an improved method for producing concentrated solutions of urea and sulfuric acid.

It is another object to provide a method for maintaining the temperature at all points in a large volume of reacting urea and sulfuric acid at a level below the incipient decomposition temperature.

Another object is to provide a method for producing concentrated solutions of urea and sulfuric acid in which the reacting liquid phase is cooled by direct air heat exchange without polluting the atmosphere.

Yet another object of this invention is the provision of a method for producing concentrated urea-sulfuric acid solutions containing little or no toxic by-products such as ammonium sulfamate and/or sulfamic acid Another object is the provision of a continuous method for producing urea-sulfuric acid reaction products in relatively large volumes in which reaction parameters, including reactant composition, reaction temperature, product composition and crystallization temperature are continuously maintained at predetermined values.

Another object is the provision of an improved method for the production of concentrated, stable solutions of urea and sulfuric acid having $H_2SO_4$/urea weight ratios of at least about 1.

Another object of this invention is the provision of improved compositions comprising urea and sulfuric acid reaction products essentially or completely free of sulfamic acid and/or ammonium sulfamate.

Yet another object of this invention is the provision of an improved method for fertilizing crops with improved compositions comprising reaction products of urea and sulfuric acid essentially or completely free of sulfamic acid and/or ammonium sulfamate.

Other objects, aspects and advantages of this new invention will be apparent to one skilled in the art in view of the following disclosure, the drawings, and the appended claims.

SUMMARY OF THE INVENTION

This invention relates to methods of producing concentrated solutions of urea and sulfuric acid in which reaction temperature is continuously maintained below incipient decomposition temperature to prevent explosive autocatalytic decomposition or, in milder cases, the formation of one or more undesirable reaction by-products. It also relates to methods capable of continuously maintaining predetermined product composition, crystallization temperature, and concentrations of urea, sulfuric acid and, optionally, water in the reaction zone, and to the production of products free of reaction by-products such as ammonia, ammonium sulfate, carbon dioxide, ammonium sulfamate, and/or sulfamic acid In accordance with one embodiment of this invention, urea, sulfuric acid and, optionally, water are simultaneously added to a reaction zone at constant relative rates that are controlled to achieve a concentration of each respective component corresponding to a predetermined product composition within the ranges of about 5 to about 75 weight percent urea, about 5 to 85 weight percent sulfuric acid and 0 to about 35 weight percent water. The urea and sulfuric acid are introduced separately of each other and, in combination, constitute at least about 65 weight percent feed to the reaction zone. The reactants produce a reacting liquid phase which is continuously agitated during the addition of urea, acid and water to evenly disperse all of the reactants throughout the reacting liquid phase. During the process, the temperature of the reacting liquid phase is maintained at a level of at least about 120° F. and less than about 176° F., and below its incipient decomposition temperature, as shall be more specifically described hereinafter.

In accordance with another embodiment, the reacting liquid phase is continually cooled in a direct contact air heat exchanger in which the liquid phase is countercurrently contacted with air and returned to the reaction vessel while heated air containing little or no contaminants is released to the atmosphere.

In accordance with another embodiment of this invention, there are provided reaction products of urea and sulfuric acid essentially or completely free of toxic reaction by-products such as sulfamic acid and/or ammonium sulfamate In accordance with yet another embodiment, soils and/or crops are fertilized or treated with solutions comprising urea and sulfuric acid reaction products essentially or completely free of toxic reaction products such as sulfamic acid or ammonium sulfamate.

BRIEF DESCRIPTION OF THE DRAWINGS

The invention will be more readily understood by reference to the drawings of which.

DETAILED DESCRIPTION OF THE INVENTION

Figure 1:
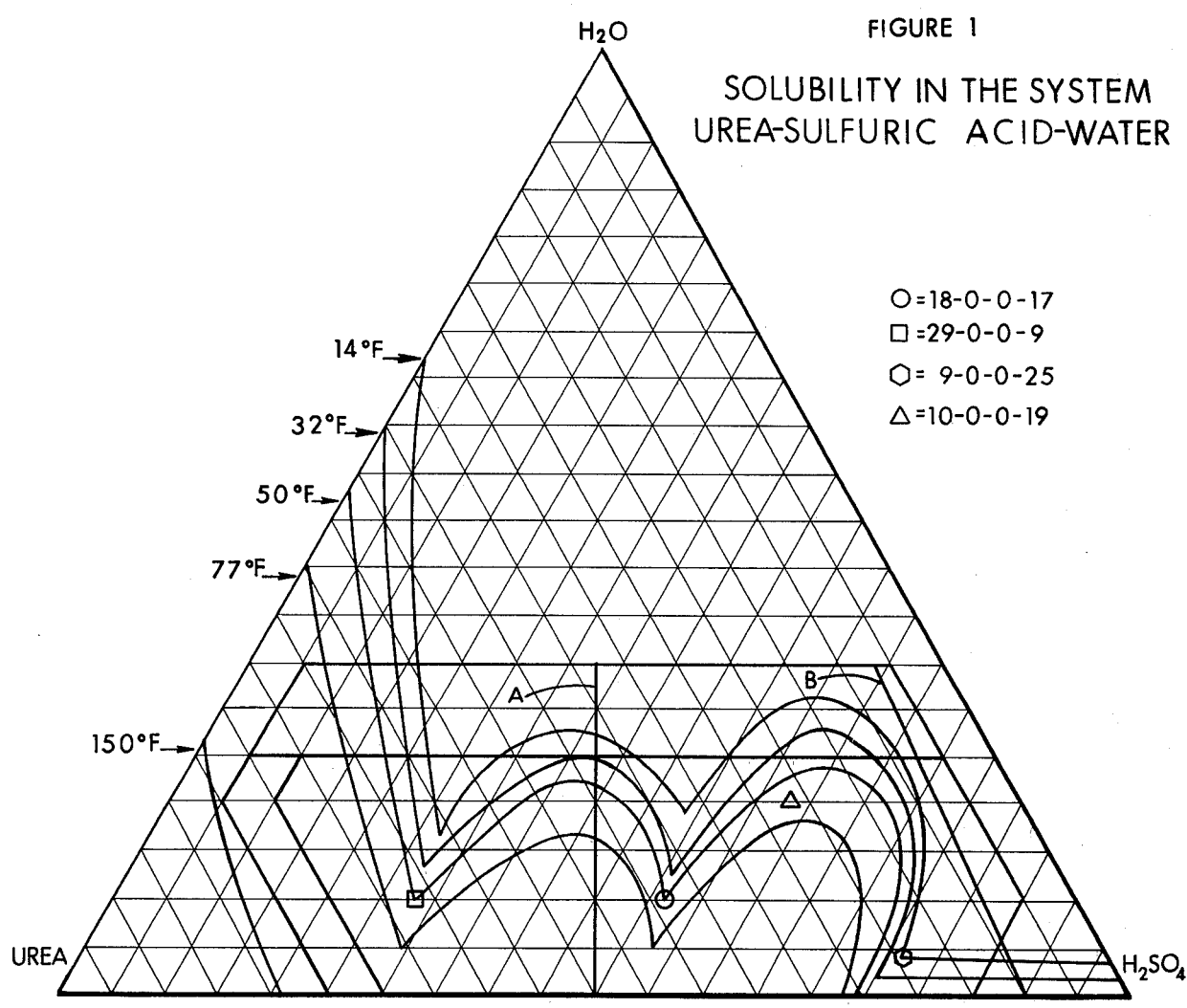
FIG. 1 is the ternary phase diagram for the urea, sulfuric acid and water system illustrating isotherms at several different temperatures and the existence of three prominent eutectics.

The compositions of this invention are clear, homogeneous reaction products of urea, sulfuric acid and, optionally, water. Water may be present in only minor amounts or may be omitted entirely in some compositions as illustrated in the ternary phase diagram of FIG. 1. These compositions usually comprise about 5 to about 75 weight percent, preferably at least 10 to about 70 weight percent urea; about 5 to about 85 weight percent, preferably about 10 to about 80 percent sulfuric acid; and about 0 to about 35, usually less than about 25, and preferably less than about 15 weight percent water. Urea and sulfuric acid, in combination, will usually comprise at least about 65 weight percent, generally at least about 75 weight percent, and preferably at least about 85 weight percent of the product solution.

Four digit product designations, e.g., 18-0-0-17, are conventionally used in the agricultural industry to designate the concentration of nitrogen, phosphorus (as $P_2O_5$), potassium (as $K_2$), and a fourth component—in this case sulfur expressed as the element. Thus, the composition 18-0-0-17 contains 18 weight percent nitrogen derived from urea and 17 weight percent sulfur derived from sulfuric acid. Using the atomic weights for nitrogen (14.01) and sulfur (32.07) and the molecular formulas and molecular weights for urea (60.06) and sulfuric acid (98.08), it can be readily determined that this formulation contains 38.58 weight percent urea and 51.99 weight percent sulfuric acid. By difference, the solution contains 9.43 weight percent water. The composition of all other products can be determined by the same procedure.

The ternary phase diagram of FIG. 1 defines the relative proportions in weight percent for each of the three components— urea, sulfuric acid, and water—at any point within the diagram. At each apex of the triangle, the system consists completely of the indicated component. Thus, urea concentration at the urea apex is 100 percent urea and diminishes linearly to 0 percent urea along a straight line from he urea apex to the midpoint of the $H_2O$—$H_2SO_4$ boundary line, i.e., the side of the triangle opposite the urea apex. The same is true of the remaining two components; water and sulfuric acid.

The diagram also illustrates the isotherms for the system at 14° F., 32° F., 50° F., 77° F., and 150° F. The 150° F. isotherm is illustrated only partially at the lower left-hand portion of the phase diagram. Each isotherm defines compositions which, if cooled below the temperature indicated for the respective isotherm, will precipitate components or reaction products of the system. However, the solutions will super-cool dramatically, e.g., by as much as 50° F., or more, under quiescent conditions in the absence of seed crystals, impurities, etc. that promote crystallization.

As indicated by the pattern of the isotherms, systems having a fixed ratio of urea to sulfuric acid become more stable at lower temperatures as the water concentration is increased. This is true throughout most of the phase diagram with the exception of the region in the vicinity of the higher acid eutectic in the lower right-hand portion of the phase diagram.

Three prominent eutectcs are apparent within the region of the illustrated isotherms. Each eutectic represents a discontinuity in the response of the system, e.g., of crystallization point, to changes in the solute concentration, and indicates the point of maximum solute concentration for a given isotherm in the region of the phase diagram associated with each eutectic.

As indicated in the legend on FIG. 1, the left-hand eutectic on the 50° F. isotherm corresponds to the formulation 29-0-0-9. The middle eutectic on the same isotherm corresponds to the composition 18-0-0-17. The right-hand eutectic on the 14° F. isotherm corresponds to the formulation 9-0-0-25, and the formulation intermediate the 50° F. and the 77° F. isotherms between the middle and right-hand eutectics indicated by a triangular designation corresponds to the formulation 10-0-0-19.

The dramatic discontinuities in these isotherms and their proximity to each other confirm the observation that minor variations in reactant phase or product composition can result in dramatic changes in crystallization temperature.

The bold lines within the diagram generally define the boundaries for formulations for which the methods of this invention are uniquely suited. Bold lines parallel to one side of the triangular diagram define a fixed concentration of the solute designated at the apex of tne triangle opposite the side to which that line is parallel. Thus, the higher horizontal line in FIG. 1 borders the area of formulations containing 35 percent water or less and varying amounts of urea and sulfuric acid. The area below the lower horizontal line defines formulations containing 25 weight percent water or less.

Vertical line A in the center of the diagram intersecting the urea-sulfuric acid at the half-way point defines compositions having a one-to-one weight ratio of urea to sulfuric acid. The area to the right of that vertical line defines formulations having $H_2SO_4$/urea weight ratios of 1 or greater. The angular line B in the lower right-hand portion of the diagram intersects the urea-$H_2SO_4$ boundary at the 90 percent sulfuric acid-10 percent urea point and, if extended, would intersect the water apex. Thus, it represents formulations having a 9:1 weight ratio of sulfuric acid to urea.

A very limited range of compositions having crystallization temperatures over 150° F. can be produced by the methods described herein when the temperature required to maintain the reaction product in solution form does not exceed the incipient decomposition temperature for that composition. However, the products of this invention preferably have crystallization temperatures below about 150° F., usually less than about 80° F., and preferably less than about 50° F. The lower crystallization temperatures are particularly preferred if the composition is to be used directly after production without dilution.

One unique advantage of the methods described herein is that they can consistently produce compositions containing precisely predetermined proportions of urea, sulfuric acid and water. This feature is of particular importance due to the fact that minor deviations in composition can dramatically affect crystallization temperature and can result in product solutions that crystallize at intolerably high temperatures. For instance, compositional differences as little as 2 percent in urea and sulfuric acid can change crystallization temperature by as much as 20° F. This difference could result in complete solidification of a product solution in transportation, processing or storage facilities. accordingly, very accurate and continuous control of product quality is an essential aspect of the methods of this invention, particularly in continuous processes discussed hereinafter.

Even minor decomposition of any of these compositions results in the formation of known toxic materials including ammonium sulfamate and sulfamic acid. Furthermore, incipient decomposition temperatures vary from product to product. For instance, the 29-0-0-9 formulation incipiently decomposes, i.e., begins to decompose, at temperatures of about 159° F. and above, and thus should not be exposed to any temperature in excess of that point. If it is, system temperatures may become uncontrollable and the product will contain minor, if not significant, amounts of sulfamic acid or ammonium sulfamate. Thus, adequate temperature control is imperative to prevent decomposition which, once commenced in a large volume of inadequately cooled material, can lead to very rapid temperature escalation, e.g., up to 600° F. and higher, and to the literal explosion of the reactor and associated processing facility.

The magnitude of the reaction exotherm and incipient decomposition temperature variations are illustrated in the following table.

| Composition | Incipient Decomposition Temperature | Heat of Reaction BTU's per Ton |
|---|---|---|
| 29-0-0-9 | 158° F. | 73,600 |
| 18-0-0-17 | 176° F. | 173,400 |
| 9-0-0-25 | 176° F. | 149,500 |
| 10-0-0-19 | 176° F. | 195,500 |

The heats of reaction reported in the aforegoing table and elsewhere herein were determined calorimetrically using the reaction of prilled urea with 98 percent sulfuric acid and the amount of water required for the designated formulation.

Incipient decomposition temperatures can be determined by very gradually increasing the temperature of a solution of the designated composition until gas evolution is first observed. The incipient decomposition temperature of any formulation can be determined by this procedure.

The evolved gas comprises carbon dioxide and, in the absence of unreacted sulfuric acid, may also comprise ammonia. In the presence of unreacted sulfuric acid, a condition that exists in the reaction zone, the ammonia would react very exothermically with sulfuric acid to increase solution temperature and heat load at a rate even faster than that occasioned by the sulfuric acid-urea reaction. This mechanism may be partially responsible for the observed autocatalytic composition of these solutions at elevated temperature.

As a general rule, incipient decomposition temperatures for the formulations defined herein range from about 155° F. to about 176° F. with the higher decomposition temperatures being associated with products having higher acid to urea ratios.

Gross system temperature is not an adequate indication of incipient decomposition at localized points within a relatively large volume of solution, e.g., in a commercial reactor. For instance, the direct addition of concentrated sulfuric acid to a large volume of urea as described in U.S. Pat. No. 4,116,664 referred to above, will invariably result in localized overheating and temperatures in excess of incipient decomposition temperatures even though the average temperature for the bulk of urea may be somewhat lower. This was confirmed by the fact that samples of materials produced in the process described in that patent were found to contain as much as 5 to 6 weight percent of the decomposition products ammonium sulfamate and/or sulfamic acid.

Solutions essentially or completely free of these toxic components can be consistently produced by the methods of this invention. Thus, solutions containing less than 0.1 percent, preferably less than 0.05 percent, and most preferably no detectable amount of ammonium sulfamate and/or sulfamic acid are obtained by adequate control of process conditions as defined herein.

Figure 2:
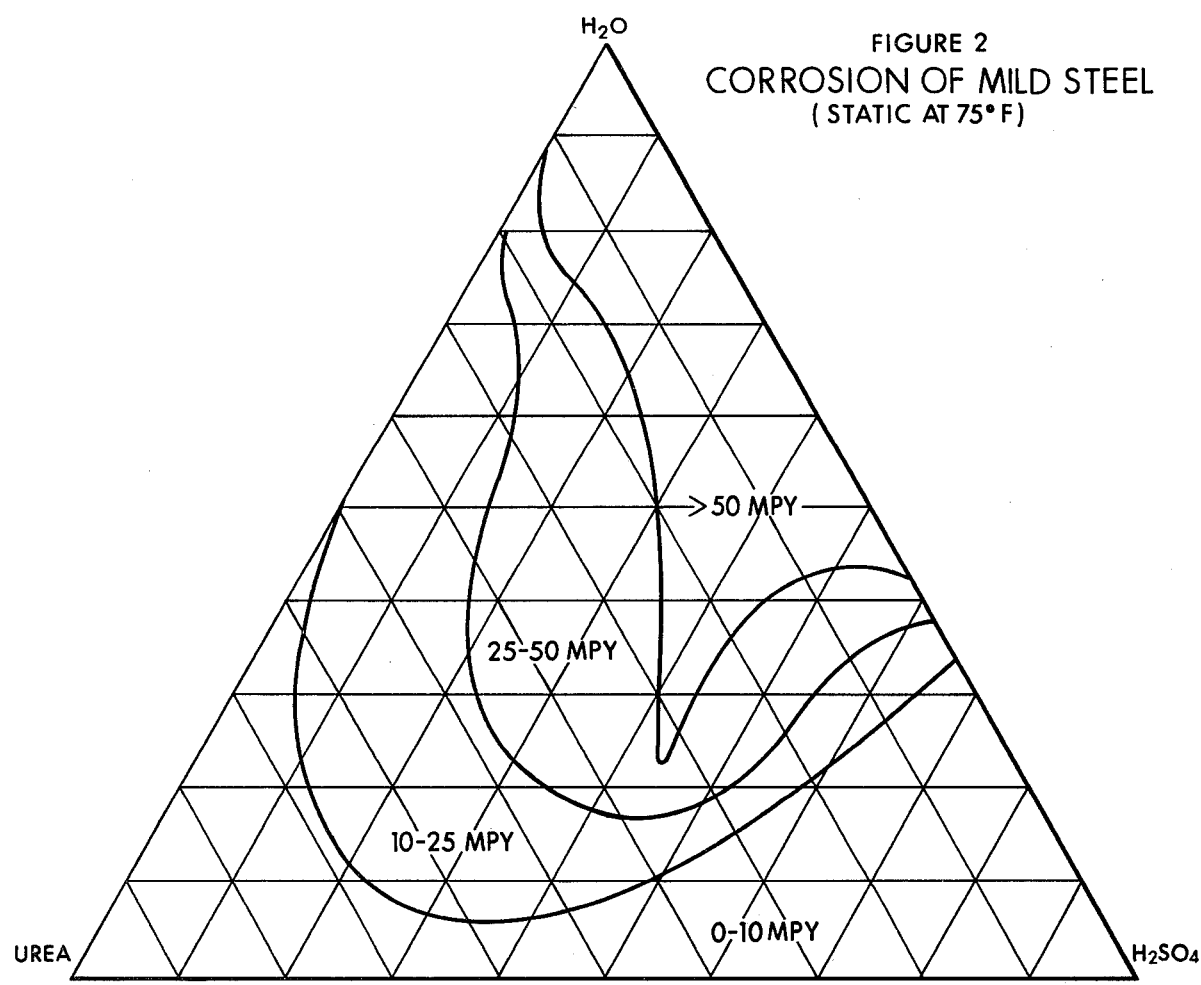
FIG. 2 is a ternary phase diagram for the system urea, sulfuric acid and water generally illustrating the static corrosion rate of various compositions on mild steel at 75° F.

Although the products produced in these methods and the reacting liquid phase comprising reaction product, urea, sulfuric acid, and, optionally, water, are less corrosive than is dilute sulfuric acid, they still exhibit significant corrosivity to both mild steel and carbon steel. The static corrosion rates of various compositions on mild carbon steel at 75° F. are illustrated generally by the ternary phase diagram of FIG. 2. As can be seen from the Figure, static corrosion of mild steel varies from nominal amounts of 0 to 10 mils per year (MPY) to more than 50 mils per year as a function of urea/acid ratio and water content. Surprisingly, the higher acid content solutions, e.g., those having sulfuric acid/urea ratios in excess of 1, have lower corrosivity than the higher urea content compositions at a comparable water concentration.

Figure 3:
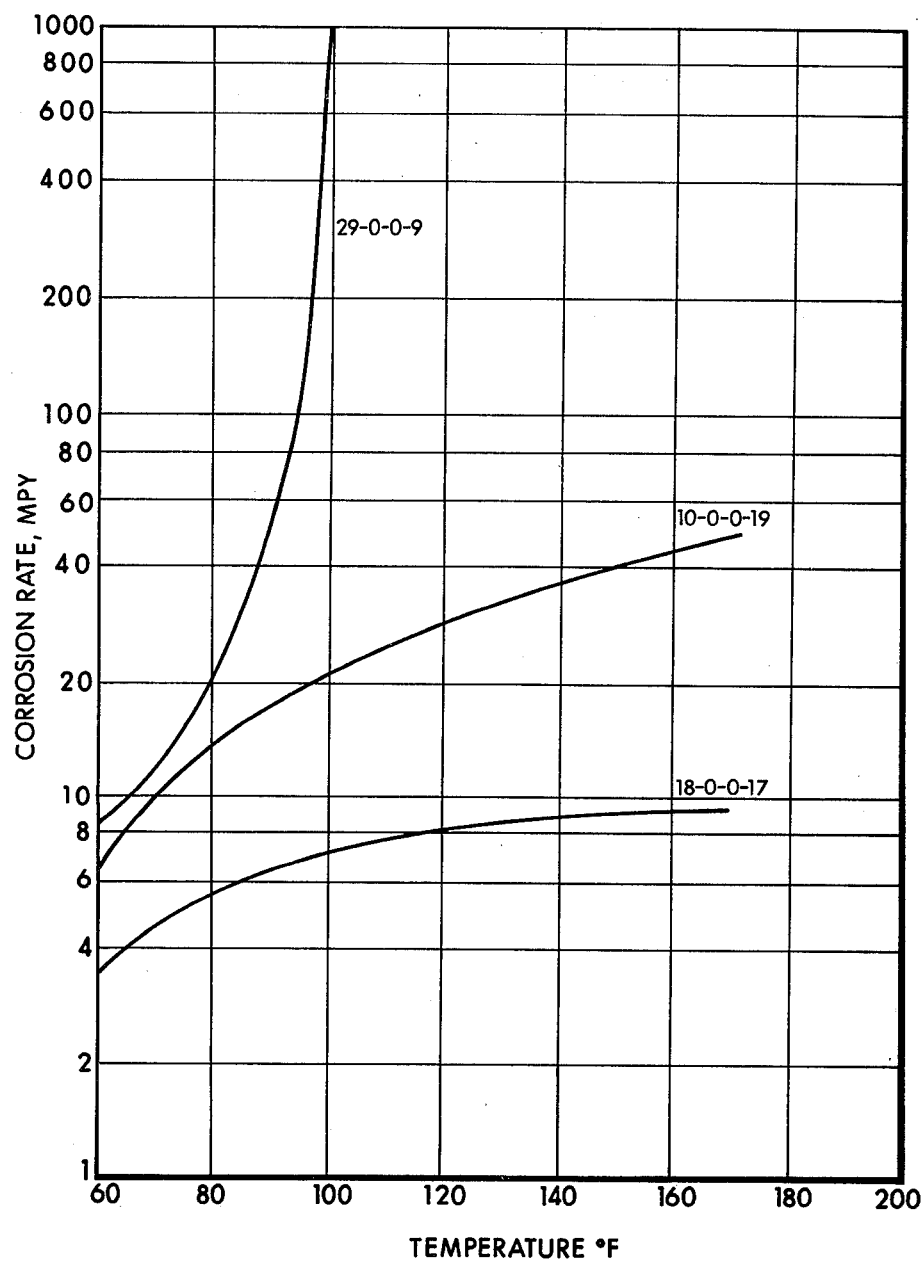
FIG. 3 illustrates the correlation between mild steel corrosion rate and temperature for three urea-sulfuric acid products.

There is also a dramatic difference in the relationships of solution temperature to mild steel corrosion rate for various formulations. Examples of these distinctions are illustrated in FIG. 3 which is a correlation of mild steel corrosion rate and solution temperature for the three formulations 29-0-0-9, 10-0-0-19, and 18-0-0-17. As illustrated in FIG. 3, the corrosivity of the 29-0-0-9 formulation, a higher urea, lower acid composition, becomes excessive at temperatures even below 100° F. Although the corrosion rates of the other two products also increase with temperature, the temperature effect is much less dramatic. In fact, it is possible to use the 18-0-0-17 formulation in mild steel equipment at temperatures as high as 160° F.

As can be seen from these observations, the corrosivity of the system can vary significantly with changes in composition. This factor contributes further to the necessity of preventing deviations from the desired composition, particularly at the elevated temperatures existing in the reaction zone.

The process can be batch or continuous, although the continuous method is preferred for several reasons. Continuous processing improves process stability and the control of composition, reaction temperature, crystallization point and corrosivity. All of these factors are important for different reasons.

Accurate control of reaction phase composition is closely related to temperature control due to the highly exothermic nature of the sulfuric acid-urea reaction. It is also closely related to crystallization point and corrosivity; minor variations in crystallization point can result in solids formation or complete "setting up" of the product in lower temperature treating, storage or application facilities. Increased corrosivity occasioned by composition changes can dramatically increase the corrosion of the reactor and processing facilities, particularly at elevated processing temperatures, as illustrated in FIG. 3.

These several characteristics can be controlled by gradually and simultaneously adding urea, concentrated sulfuric acid and water to the reaction zone at relative rates corresponding to the concentration of each component in a predetermined product composition and cooling the resultant reacting liquid phase sufficiently to maintain it at a temperature below its incipient decomposition temperature and below 176° F. at all times. As pointed out above, bulk system temperature may not accurately indicate the presence or absence of localized over-heating unless the reacting liquid phase is adequately agitated and thoroughly mixed during the course of the reaction.

Although the reaction will proceed at relatively low temperatures, it becomes too slow to be economically desirable at temperatures much below 120° F. Accordingly, the reaction is usually run at temperatures of at least 120° F., preferably below about 160° F. and most preferably at about 150° F. or less. The lower temperatures, e.g. of about 150° F.–160° F., or less, are particularly preferred with the higher urea concentrations, e.g., 29-0-0-9, due to their relative low incipient composition temperatures, and are preferred in all formulations to minimize sulfamate content.

The feed rates of all three components and the composition of the reacting liquid phase should be maintained as closely as possible to the stoichiometric proportion of each respective component in the predetermined product. Thus, the concentration of each component should be maintained within about 2 percent, preferably within 1 percent or less, of its stoichiometric value in the product.

In one preferred embodiment in which a portion of reaction phase is removed from the reaction zone and cooled by direct air contact heat exchange, some water is lost from the system and must be made up by increasing the water feed to the reaction zone by an amount proportional to the rate of water loss in the cooler.

The close tolerances on reactant composition and temperature will generally allow control of product crystallization temperature within 10° F., preferably within 5° F. or less, of the desired crystallization temperature.

Although the considerable heat of reaction theoretically can be dissipated by essentially any cooling means, such as cooling coils within the reactor, heat dissipation and temperature control are facilitated by assuring that the urea, sulfuric acid and water are introduced into a reaction zone containing a mixture of reactants and reaction product corresponding to at least about 0.1, preferably at least about 0.2 times the hourly feed rate in batch systems, provided the system is cooled adequately to avoid incipient decomposition. Much larger volumes, e.g., at least one unit weight of heel per unit weight of reactants, should be used under adiabatic conditions, i.e., in the absence of cooling. For instance, at least 0.75 pounds of inventory, i.e. heel, per pound of reactants, at a temperature of 70° F., are required to maintain a temperature of 150° F. or less in the manufacture of 29-0-0-9. Even larger inventories of 1.4 and 1.6 pounds per pound of reactants are required to maintain temperatures of 170° F. or less in the adiabatic production of 18-0-0-17 and 10-0-0-19, respectively.

In the preferred continuous embodiment in which the reacting phase is continuously cooled, the inventory of reacting mixture maintained within the reaction zone should correspond to at least about 0.5, usually at least about 1, and preferably at least 2 times the hourly feed rate. Although somewhat lower reactor volumes would be adequate to control temperature in the continuous process in some cases, particularly with less exothermic reactions such as 29-0-0-9 production. They would not be adequate to assure complete reaction of the customary forms of urea feeds, i.e., prills and/or granules. Longer holding times and thus larger reactor inventories relative to product withdrawal rate and reactant feed rate are required in the continuous process to assure that the withdrawn product does not contain unreacted urea.

The minimum reactor volume required to prevent the discharge of unreacted urea during continuous operation can be defined by the following expression, which is unique for this reaction system:

$$V_o = \frac{u}{k}(14.3\ d^2 - 1)$$

where k is the first order rate constant in reciprocal minutes, d is the diameter of the largest urea particles in millimeters, $V_o$ is the volume of the liquid phase within the reaction zone in gallons, and u is the production rate from the reaction zone in gallons per minute.

From this relationship, it can be seen that theoretically very small reactor volumes could be used with very small diameter urea feeds, e.g., urea dust. As a practical matter, however, minumum volumes of about one-half hourly production are required to provide sufficient inventory for adequate cooling to prevent incipient decomposition and for more effective process control.

The first order rate constant can be determined from the expression unique to this system:

$$k = \frac{1}{t}(\ln d^2 + 2.659)$$

where t is the time in minutes required for dissolution of the type of urea feed, e.g. prills, pellets, granules, etc.

The dissolution rate varies with urea type, e.g., prilled urea or granular urea. Prilled urea is usually less dense and somewhat more porous than is granular urea, and is produced by forming droplets of molten urea in a prilling tower of sufficient height to allow the urea droplets to solidify during their descent. Granular ureas are usually produced by spraying molten urea onto urea "seeds" or dust in granulating apparatus such as pan or drum granulators.

The reaction rate constant can be determined experimentally for any given product composition and urea feed type by determining the rate at which the urea particle dissolves in the given formulation.

Figure 4:
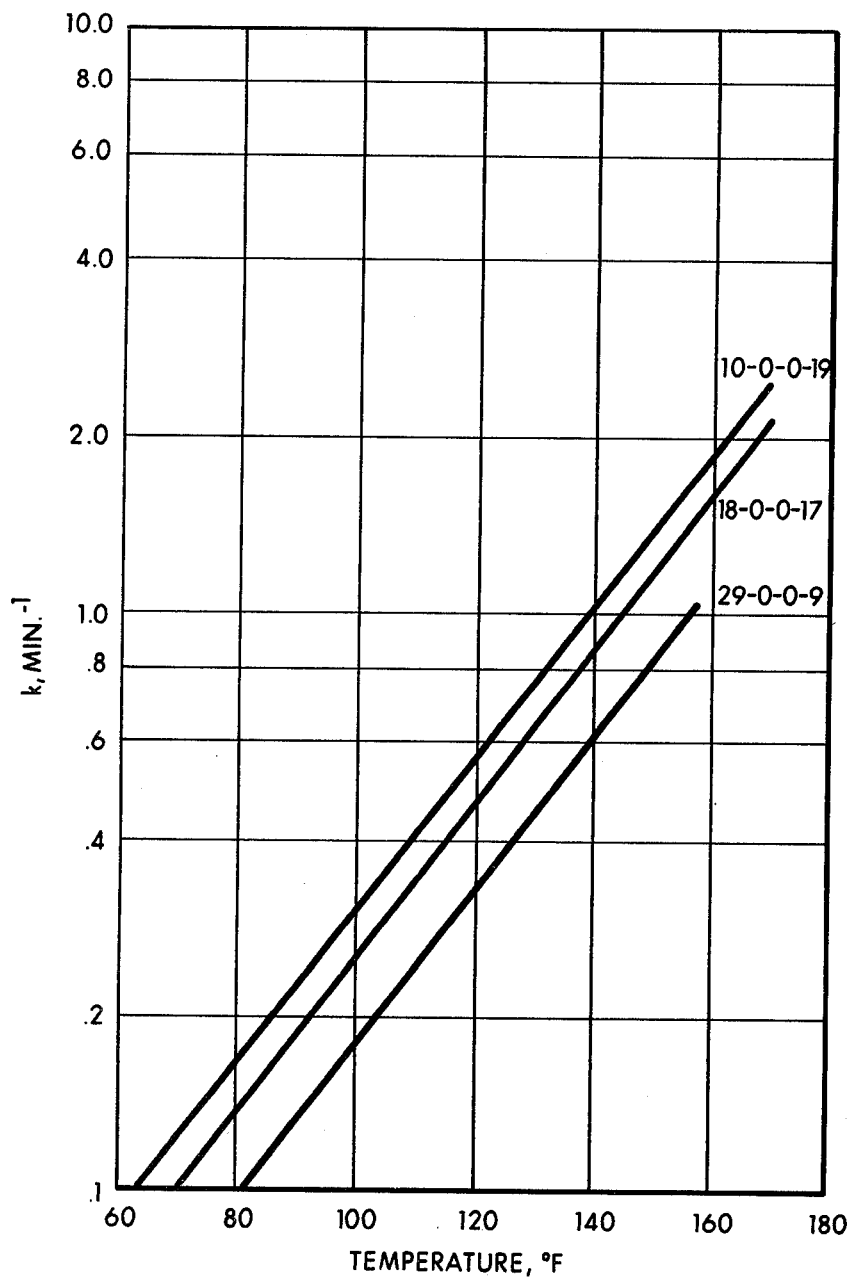
FIG. 4 is a correlation of the first order reaction rate constant versus temperature for the three designated urea-sulfuric acid products using prilled urea feed.
Figure 5:
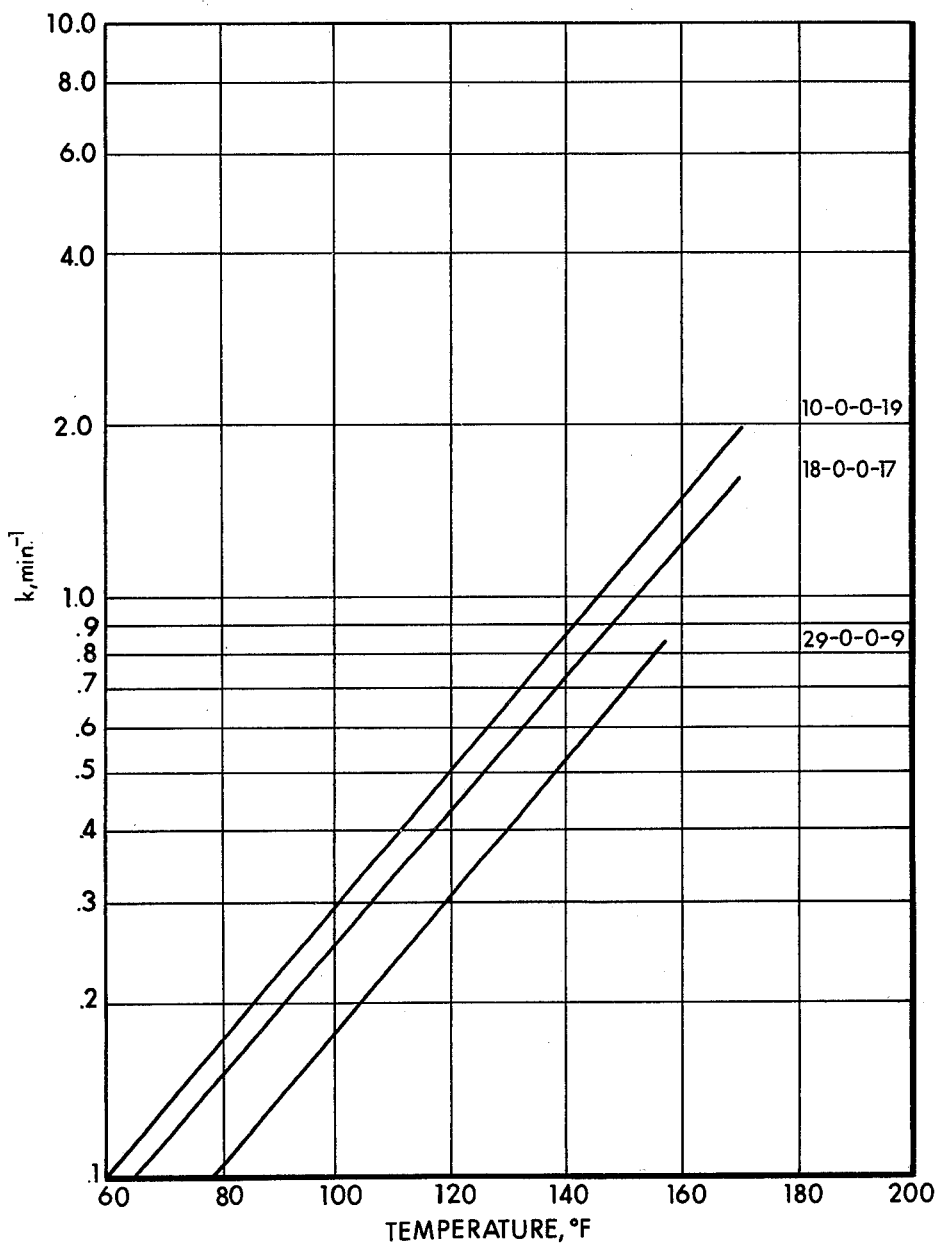
FIG. 5 is a correlation of the first order rate constant with temperature for the designated urea-sulfuric acid products using granular urea feed.

The reaction rate is first order and varies markedly with temperature. Experimentally observed values for the rate constant for the three products, 29-0-0-9, 18-0-0-17, and 10-0-0-19, and the effect of temperature on the rate constant for each respective product using prilled urea and granular urea, are graphically illustrated in FIGS. 4 and 5, respectively.

The rate of urea dissolution can be determined by any one of several means. The data illustrated in FIGS. 4 and 5 were obtained by suspending several urea prills or granules of known diameter by mild agitation in a large excess of the selected solution at a predetermined temperature. The elapsed time within which the urea particle disappeared was determined by visual observation and was taken as the value of t for that urea type and product solution. The same procedure can be used to determine the value of t, and thus the reaction rate constant k, for any combination of urea type and reactant phase composition.

The reaction rate constant k diminishes markedly with temperature. Thus, from the relationship between $V_o$ and reaction constant discussed above, it can be seen that larger reactor volumes are required to obtain the same production rate of the same product at lower reaction temperatures.

Adequate control of the factors discussed above, particularly heat load, solution temperature, composition, crystallization point and corrosivity, becomes particularly important in industrial scale reactors of relatively large volume in which the excess heat associated with decomposition cannot be rapidly dissipated. Most commercial systems will have reaction zone volumes of at least about 50 gallons, usually at least about 100 gallons, and most often in excess of 500 gallons. The reaction phase is relatively viscous even at reaction temperatures, and that factor, combined with the relatively low specific heat of these compositions, makes adequate temperature control and rapid heat exchange even more difficult in the large volumes associated with commercial production.

Figure 6:
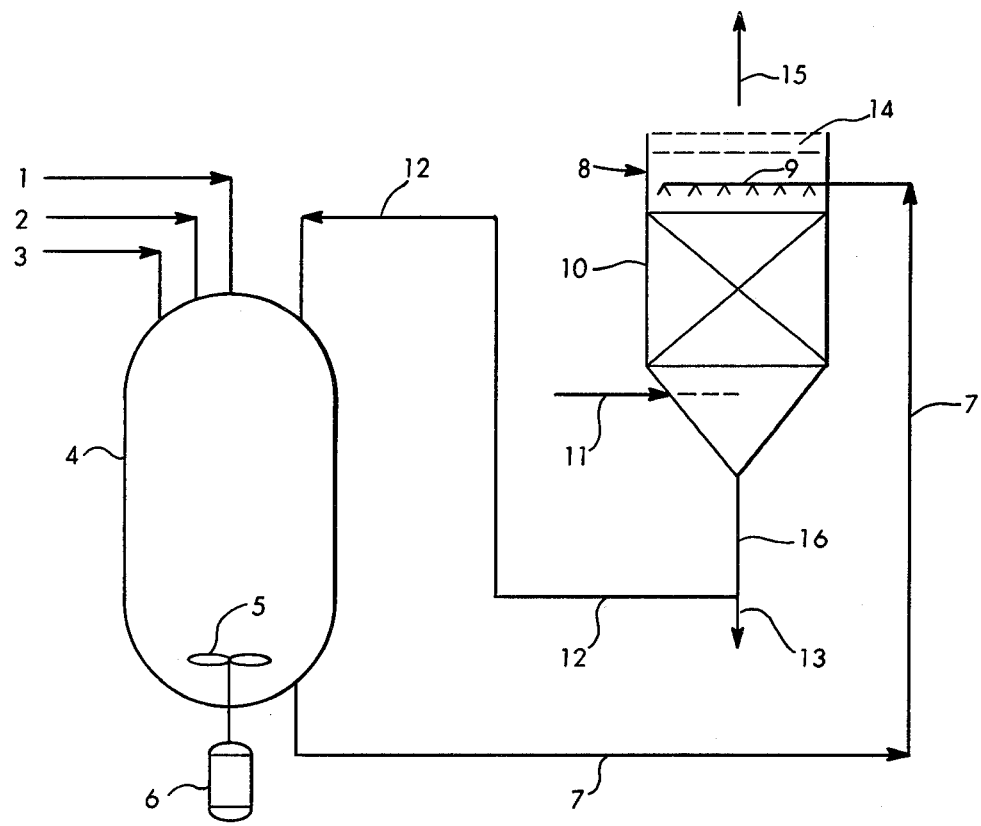
FIG. 6 is a schematic illustration of an apparatus and process flow system suitable for use in one embodiment of this invention.

The process can be better understood by reference to FIG. 6 which is a schematic illustration of one embodiment of the preferred, continuous method of this invention employing countercurrent direct air heat exchange. Solid urea, water and sulfuric acid are simultaneously and continuously added through pipes 1, 2, and 3 to reactor 4 provided with efficient agitating means such as impeller 5 driven by motor 6 or other means. The reacting liquid phase is continuously passed from reactor 4 through pipe 7 to spray nozzles 9 in the direct air heat exchanger 8. Ambient air or cooled air is introduced to the lower portion of the heat exchanger through pipe 11 or other means, and passes upwardly through packed section 10 into direct contact with downward flowing liquid phase. Following contact with the liquid, the warmed air passes through demister section 14 and can be emitted directly to the atmosphere. Even at elevated temperatures, very little sulfate is present in the effluent air. Cooled product is removed from heat exchanger 8 through pipe 16 and is either passed to storage via pipe 13 or is returned as cooling medium to reactor 4 by pipe 12.

Obviously, a number of various process schemes can be designed in view of the principles of operation discussed above. For instance, multiple reactors or multiple coolers can be provided and the reactant feeds can be proportioned between the multiple reaction vessels. Also, more conventional heat exchange means such as conventional tube or coil coolers can be employed in place of, or in addition to, the direct contact air cooler. However, the direct contact air cooler is particularly preferred since it mitigates corrosion and expedites heat exchange with the viscous reacting liquid phase and can be operated inexpensively with ambient air.

In the preferred continuous embodiment, urea, sulfuric acid and water are continuously and simultaneously fed to the reaction zone, with urea and sulfuric acid being fed separately of each other, at rates equivalent to the stoichiometric proportions of each respective component in the predetermined product within the ranges discussed above. Urea can be fed in any available form, such as prills, granulars, powder and the like.

The minor variations in the purity of commercial ureas can be sufficient to significantly affect process conditions, even though purity varies only from about 46 to 46.6 weight percent nitrogen. The urea feed is preferably periodically analyzed for nitrogen content and its feed rate adjusted accordingly in view of the stoichiometry of the desired product. However, that precaution is not essential when the process is controlled as described hereinafter, and does not eliminate the need for such control.

The sulfuric acid feed can be concentrated sulfuric acid, usually 92 to 98 weight percent $H_2SO_4$, or it can be diluted with water before introduction into the reaction zone although the amount of water cannot exceed that allowable in the predetermined product. Fuming sulfuric acid can also be used. Essentially, any acid source is suitable. Spent alkylation acid can also be used in this process. Concentrated sulfuric acid is presently preferred due to commercial availability, and the markedly higher corrosivity of more dilute acid solutions.

If dilute acid feeds are employed, care should be taken to assure that the amount of water added with the acid feed does not exceed the amount permitted in the product. This amount varies substantially from product to product. For instance, the minimum acid concentration that can be employed in the manufacture of 18-0-0-17 is 85 weight percent $H_2SO_4$ for 10-0-0-19 and 73.1 weight percent $H_2SO_4$ for 29-0-0-9. The use of more dilute acids will result in the addition of excess water to the reaction zone which will result in the formation of an off-specification product unless the excess water is somehow removed in the process.

Although numerous other constituents potentially useful in the final composition may be added to the reactor such as crop micronutrients and other compounds, it is presently preferred to produce the urea-sulfuric acid mixtures neat and make custom formulations downstream as required.

Once the continuous process is commenced, it can be run indefinitely provided that sufficient provision is made to control corrosion and that changes in product composition are not required.

In starting up the preferred embodiment of this invention for either batch or continuous operation, a product inventory can be manufactured in the reaction vessel by gradual addition of the reactants in stoichiometric proportions provided that sufficient cooling is available to maintain the reacting mixture at a temperature below the incipient decomposition temperature. It is presently preferred, however, to begin with an inventory of material produced in a previous operation and retrieved from storage. In either event, the initial inventory, or heel, should be of the same composition as that of the desired product so that deviations in composition, crystallization point, heat of reaction or corrosivity do not occur during the process.

During startup, the initial inventory may be of lesser volume than that ultimately maintained in the reaction zone to assure complete reaction. Apparently, the initial heel acts in a manner described by Moore and Mullen, Jr., supra, to enable adequate control of reaction temperature developed by the exothermic reaction during startup.

The heat of reaction involved in the formation of any product can be determined calorimetrically by reacting the selected urea and sulfuric acid feeds and, optionally, water when required by the formation, in any one of several available calorimeters under closely controlled temperature conditions sufficient to prevent incipient decomposition. The heat of reaction for a given product can then be used to calculate the total heat load on a given system, and thus the cooling capacity required for a given production rate. In the alternative, the heat of reaction can be calculated from the following expressions:

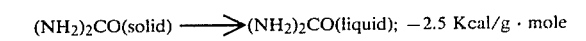

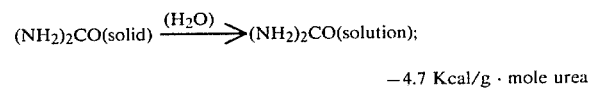

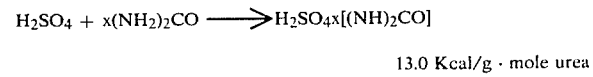

The overall reaction is illustrated by:

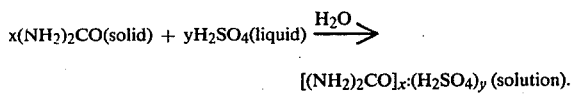

$$x(NH_2)_2CO(\text{solid}) + yH_2SO_4(\text{liquid}) \xrightarrow{H_2O} [(NH_2)_2CO]_x \cdot (H_2SO_4)_y \text{ (solution)}.$$

Applying these expressions to the amount of solid urea and sulfuric acid added to the reaction zone will yield the amount of heat to be expected in the reaction. That value in turn allows the determination of production rates permissible in any system assuming the process is limited by cooling capacity, or, conversely, the cooling capacity that must be provided for the production of that product at a given rate.

As discussed before, one of the most difficult problems in the design and operation of these methods is the control of the exothermic heat of reaction and reaction temperature. Reaction temperature must be maintained below permissible maximums and is preferably maintained above certain minimums so that the practical operating range is relatively narrow. Even minor changes in process conditions can result in temperature excursions beyond these ranges.

The high viscosity, low specific heat, low maximum allowable temperature, high corrosivity to conventional alloys at high fluid velocity, and low water content of these products place severe limitations on conventional heat exchangers. Nevertheless, conventional designs such as shell and tube, coil, etc., can be used although they must be designed in view of the product characteristics mentioned above.

It has been found, however, that the hot reacting liquid phase within the reaction zone can be adequately cooled by direct contact countercurrent heat exchange with ambient air making use of a relatively simple cooling unit design such as that illustrated in FIG. 6, and that this approach mitigates the problems associated with the high corrosivity, high viscosity and low specific heat of these compositions. It has also been found that the direct air heat exchange method adequately cools the reacting liquid phase even though it has very low vaporizable water content, and that it does so without introducing or removing uncontrollable amounts of water to or from the reaction phase or polluting the atmosphere.

The contact section of the cooler illustrated in FIG. 6 can consist of any corrosion and heat resistant shell, e.g., stainless steel, and an adequate quantity of acid-resistant packing of any one of numerous types. Acceptable packing materials include plastic, glass, stainless steel or ceramic saddles and the like.

The design of the direct contact exchanger for any particular operation should be based upon the highest heat load anticipated which is a function of product composition and production rate, and can be established by testing different combinations of packing material, packing section design, product flow rate and air flow rate through the exchanger.

As a practical matter, the packing section should have a height to diameter ratio of at least 1 and, for most packing materials, should be operated at liquid flow rates of about 25 to about 200 lbs. per hour per cubic foot of packing and air flow rates of about 25 to about 100 cubic feet per minute per cubic foot of packing material. Significantly higher liquid flow rate should be avoided to avoid flooding the cooler. Higher air flow rates should be avoided to prevent excessive resistance to downward liquid flow and product carryover into the demister section.

Continuous monitoring and compensation for water removal from the system is preferred, and is necessary for precise control of composition, temperature, and corrosion. This can be achieved by monitoring product or reactor phase composition or water removal rate in the cooler, and adding water as required to the reaction zone.

It has also been found that sulfate emissions from the cooler can be controlled at levels sufficiently low that they do not constitute a pollution hazard. Sulfate emissions are primarily related to the air/liquid velocity ratio in the packing section of the cooler and are acceptably low at air/liquid velocity ratios of about 120 or less. However, they can increase dramatically at air/liquid ratios substantially above that limit.

Product composition can be controlled by periodically sampling the reaction phase or product effluent and analyzing for sulfuric acid, urea and water, and gradually modifying reactant feed rates as necessary to maintain specification product composition.

Acid content can be determined by standard acid titration techniques, and both acid and urea concentrations can be determined by mass spectrographic analysis, high precision infrared or liquid chromatographic analysis, or by standard wet chemical test procedures. Having determined sulfuric acid and urea concentration, water can be determined by difference. Product composition is also reflected by specific gravity and refractive index. Thus, one or both of these tests can be used in combination with total acidity to determine urea and the sulfuric acid concentration while water, again, can be determined by difference.

As pointed out above, the methods of this invention are capable of producing urea-sulfuric acid reaction products containing little or no sulfamate which usually consists of sulfamic acid, ammonium sulfamate, or combinations of those compounds. The preferred compositions contain less than about 0.1 weight percent, and preferably no detectable amount of sulfamic acid and/or ammonium sulfamate. Sulfamates are known herbicides and ammonium sulfamate is registered as a herbicide under the Federal Insecticide, Fungicide and Rodeticide Act. Thus, for several reasons, the absence of sulfamates makes these compositions particularly preferred as fertilizers for animal or human food crops in contrast to previously available urea-sulfuric acid reaction products that contained significant amounts of sulfamic acid and/or ammonium sulfamate.

These compositions can be used as pre-plant, pre-emergent or post-emergent fertilizers and can be applied either topically, subsurface, foliarly or through irrigation systems. They can be applied directly as the concentrates or after dilution with water within the range of about 0.5 to about 100 volumes of water per volume of concentrate. Even minor dosage rates have a beneficial agronomic effect. However, the compositions are usually applied at rates of at least about 40, and preferably about 100 to about 400 pounds of urea per acre.

The concentrated and diluted compositions can also be foliarly applied to resistant crops having sufficient waxy cuticle to prevent excessive phytotoxicity. Illustrative are members of the lily family, including onions, garlic, etc.; leeks, broccoli, brussel sprouts, red cabbage, cauliflower, celery, cotton, carrots, asparagus, dormant alfalfa, dormant parsley, and monocotyledonous grain crops and grasses of the family Gramineae such as wheat, barley, rye, bermuda grasses, blue grass, and the like. However, solutions diluted with water in ratios within the ranges described above and dosages of about 10 to about 30 gallons per acre (undiluted basis) are presently preferred for foliar use in order to reduce the possibility of crop damage due to uneven distribution and localized overdose.

EXAMPLE 1

The composition 18-0-0-17 was continuously produced from prilled urea, concentrated sulfuric acid and water using an apparatus similar to that illustrated in FIG. 6 having a 300 gallon stainless steel reactor and a countercurrent direct air heat exchanger. The heat exchanger packing section was 15 inches in diameter and 6 feet in height and was packed with 1 inch polypropylene Intalox Saddles.

The run was commenced by adding to the reactor 76 gallons (1,000 lbs.) of 18-0-0-17 and then simultaneously feeding urea, sulfuric acid and water in separate streams and stochiometric quantities until reactor temperature reached about 150° F. Recirculation through the cooler was then commenced and product withdrawal was initiated after the active reaction zone volume, i.e., the total volume of product-containing reacting liquid phase, had reached the designated volume of 150 gallons.

The system was then operated continuously for 16 hours during which time prilled urea, concentrated sulfuric acid and water were independently and continuously added to the reactor at the following rates: urea, 386.3 lbs. per hour; sulfuric acid, 521.5 lbs. per hour; and water, 127.5 lbs. per hour. Some water was added with the sulfuric acid which had a concentration of 93.76 $H_2SO_4$. The feed water contained 35.3 lbs. per hour of makeup water to account for the water removed in the cooler.

The active volume in the reaction zone was maintained at a level of approximately 150 gallons (1950 lbs.) and product 18-0-0-17 was continuously removed from the return line from the cooler to the reactor at a rate of 1000 lbs. per hour.

Reaction temperature was continuously monitored by a temperature probe within the reactor vessel and was maintained at 159° F. throughout the run. The reaction zone heat load was 100,491 BTUs per hour and the ratio of active reactor volume to hourly production volume was 1.95.

Air flow to the cooler was maintained at 243 cubic feet per minute with a product recycle rate through the cooler to the reactor of 600 gallons per hour. Product composition, reaction temperature, and other process conditions were maintained at predetermined levels by monitoring reaction temperature, reactant feed rates, water loss, product withdrawal rate, and product composition, and making minor changes in reactor feed rates as required.

EXAMPLE 2

The operation of Example 1 was repeated using the following feed rates: urea prills, 193.2 lbs. per hour; sulfuric acid (94.70 percentage $H_2SO_4$), 275.4 lbs. per hour; and water, 45.6 lbs. per hour. The water feed to the reaction zone comprised 14.2 lbs. per hour water in addition to that required by the stoichiometry of the reaction to replace water removed in the air cooler.

Reacting liquid phase was recycled through the cooler operating at an air rate of 193 cubic feet per minute and was returned to the reactor at a rate of 900 gallons per hour. Product was removed from the reaction zone at a rate of 500 lbs. per hour to maintain a ratio of reactor volume to hourly production rate of 2.5. The temperature of the reacting liquid phase within the reaction vessel was maintained at 138° F. throughout the run.

Total heat load was 52,049 BTUs per hour and product quality was maintained by monitoring product composition as described in Example 1. The product was analyzed for sulfamates and was found to be free of sulfamic acid and ammonium sulfamate.

The only emission in the cooler exhaust gas was a trace amount of entrained product and remained relatively constant at a level of 20 grams per hour throughout the run.

The lower reaction temperature of 138° F. substantially reduced reaction rate and markedly reduced total heat load on the system.

EXAMPLE 3

The operation of Example 1 was repeated for the production of 29-0-0-9 at a reaction temperature of 141° F. and reactant feed rates as follows: urea, 1337 lbs. per hour; sulfuric acid (91.80 weight percent $H_2SO_4$), 646 lbs. per hour; and water, 292 lbs. per hour. The water feed comprised 11.4 lbs. per hour required to replace water lost in the cooler.

Product 29-0-0-9 was removed at a rate of 2275 lbs. per hour to maintain a reactor volume/production rate ratio of 1.8.

These conditions resulted in a total heat load of 79,096 BTUs per hour. Temperature was controlled by the air cooler described in Example 1 operating at an air flow rate of 72 cubic feet per minute and a product recycle rate to the reaction vessel of 900 gallons per hour.

EXAMPLE 4

Solution 10-0-0-19 was produced by the procedure described in Example 1 operating at a reaction temperature of 173° F. Reactants were continually passed to the reactor at the following rates: urea, 252 lbs. per hour; sulfuric acid (95.7 weight percent $H_2SO_4$), 710 lbs. per hour; water, 242 lbs. per hour. The feed to the reaction zone comprised 36.8 lbs. per hour water in addition to that required by the stoichiometry of the reaction to replace water lost in the cooler. Product 10-0-0-19 was continuously withdrawn at a rate of 1167 lbs. per hour.

These conditions resulted in a reactor heat load of 113,969 BTUs per hour. Reaction temperature was controlled by operating the air cooler at a recycle rate of 900 gallons per hour to the reactor and a total air flow of 193 cubic feet per minute.

EXAMPLE 5

The operation of Example 4 was repeated at a reaction temperature of 158° F. and reactant feed rates as follows: urea, 180 lbs. per hour; sulfuric acid (93.9 weight percent $H_2SO_4$), 519 lbs. per hour; water, 166 lbs. per hour. 28.3 lbs. per hour water, in addition to that required by reaction stoichiometry, was included in the water feed to replace water removed in the cooler. Product was removed from the reaction zone at a rate of 837 lbs. per hour.

These conditions resulted in a total heat load of 81,809 BTUs per hour. The cooler was operated at a total air flow rate of 193 cubic feet per minute and a product recycle rate from the cooler to the reactor of 600 gallons per hour.

Product composition and crystallization temperatures and stable operating conditions were maintained by monitoring product composition and process conditions as described in Example 1.

EXAMPLE 6

Cotton was fertilized by topical application of sulfamate-free 29-0-0-9 diluted with 3 volumes of water per volume of 29-0-0-9. The dilute solution was applied at a rate of 120 gallons per acre corresponding to a nitrogen dosage of 104 lbs. per acre.

EXAMPLE 7

Green onions, approximately 2 inches high, were fertilized by foliar application of sulfamate-free 18-0-0-17 diluted with 4 volumes of water per volume of 18-0-0-17 by foliar application of the dilute solution at a rate of 100 gallons per acre corresponding to a nitrogen dosage of 47 lbs. per acre.

While particular embodiments of the invention have been described, it will be understood, of course, that the invention is not limited thereto since many obvious modifications can be made and it is intended to include within this invention any such modifications as will fall within the scope of the appended claims.

I claim:

1. A method for producing concentrated solutions of urea and sulfuric acid of predetermined composition which method comprises the steps of: (i) simultaneously adding urea, concentrated sulfuric acid, and optionally water to a reaction zone at relative rates corresponding to the concentration of each respective component in said predetermined composition and within the ranges of about 5 to about 75 weight percent urea, about 5 to 85 weight percent sulfuric acid, and 0 to about 35 weight percent water, in which said urea and sulfuric acid are introduced to said reaction zone separately of each other and, in combination, constitute at least about 65 weight percent of the feed to the reaction zone, (ii) continuously agitating said reacting liquid phase formed by the addition of said urea, sulfuric acid, and water to said reaction zone during the addition of said urea, acid and water to rapidly disperse said urea, acid, and water therein, (iii) cooling said reacting liquid phase during the addition of said urea, acid and water by an amount sufficient to maintain said liquid phase at a temperature of about 176° F. or less and below the incipient decomposition temperature of said predetermined composition, and (iv) recovering from said reaction zone a product solution having said predetermined composition.

2. The method defined in claim 1 wherein (i) said urea, sulfuric acid and water added to said reaction zone are admixed therein with said reacting liquid phase comprising urea, acid, water and reaction product of said predetermined composition, (ii) the quantity of said reacting liquid phase in said reaction zone corresponds to at least about 0.1 times the combined hourly addition rates of said urea, sulfuric acid and water, and (iii) said liquid phase is maintained at a temperature of at least about 120° F.

3. The method defined in claim 2 wherein said urea, sulfuric acid and water are simultaneously added to said reaction zone at rates corresponding to about 10 to about 70 weight percent urea, about 10 to about 80 weight percent sulfuric acid, and about 0 to about 25 weight percent water, the combined weights of sulfuric acid and urea added to said reaction zone correspond to at least about 75 weight percent of the total feed to said reaction zone; and said reacting liquid phase is continuously cooled during the addition of said urea, sulfuric acid and water by an amount sufficient to maintain a temperature of about 170° F. or less.

4. The method defined in claim 2 wherein said predetermined composition has a crystallization temperature of about 77° F. or less and a composition falling on or above the 77° F. isotherm of the ternary phase diagram of FIG. 1, and said reacting liquid phase is maintained at a temperature of about 160° F. or less.

5. The method defined in claim 2 wherein said predetermined composition contains, and the respective feed rates to said reaction zone comprise, 0 to 15 weight percent water and at least about 85 weight percent urea and sulfuric acid taken in combination.

6. The method defined in claim 2 wherein said predetermined composition comprises, and the respective feed rates to said reaction zone correspond to, about 0 to about 25 weight percent water and at least about 75 weight percent urea and sulfuric acid taken in combination, and the weight ratio of sulfuric acid to urea in said predetermined composition and in said feed to said reaction zone is at least about 1.

7. The method defined in claim 2 wherein said reacting liquid phase is maintained at a temperature of about 150° F., or less, and said product solution contains less than about 0.1 weight percent of a member selected from the group consisting of sulfamic acid, ammonium sulfamate and combinations thereof.

8. The method defined in claim 2 wherein said reaction zone comprises at least one reaction vessel and cooling means external of said reaction vessel, and wherein said method further comprises the steps of simultaneously adding said urea, sulfuric acid and water to said reaction vessel and admixing the same with said reacting liquid phase of urea, acid, water and reaction product of said predetermined composition within said reaction zone, circulating at least a portion of said reacting liquid phase from said reaction vessel through said cooling means to cool the same, and returning at least a portion of the cooled reacting liquid phase to said reaction vessel.

9. The method defined in claim 8 wherein said cooling means comprises a direct contact countercurrent air heat exchanger, and said method further comprises the steps of passing hot reacting liquid phase from said reaction vessel downwardly through said heat exchanger, passing air upwardly through said heat exchanger into direct heat exchange contact with said liquid phase and cooling said liquid phase, returning at least a portion of the resulting cooled liquid phase to said reaction vessel, and discharging said air from said heat exchanger to the atmosphere.

10. The method defined in claim 9 wherein said urea, sulfuric acid and water are continuously added simultaneously to said reaction vessel at a combined rate equivalent to a predetermined production rate, product solution of said predetermined composition is continuously removed from said reaction zone at said predetermined production rate, and the volume of said reacting liquid phase in said reaction zone corresponds to at least said predetermined production rate.

11. The method defined in claim 10 which further comprises determining (i) the amount of water removed from said liquid phase in said heat exchanger and (ii) the concentration of urea, sulfuric acid and water in a member selected from the group consisting of said liquid phase, said product solution, and combinations thereof, and adjusting the urea, sulfuric acid and/or water feed rates to said reaction vessel responsive to the determinations of items (i) and (ii) as required to maintain the composition of said product solution at said predetermined composition.

12. The method defined in claim 2 wherein said urea, sulfuric acid and water are continuously added simultaneously to said reaction vessel at a combined rate equivalent to a predetermined production rate, product solution of said predetermined composition is continually removed from said reaction zone at said predetermined production rate, and the volume of said reaction liquid phase in said reaction zone corresponds at least to the value of $V_o$ determined in accordance with the expression $V_o = k/u(14.3\ d^2 - 1)$ wherein k is the first order rate constant for said predetermined product in reciprocal minutes, d is the diameter of the largest urea feed particles in millimeters, $V_o$ is the volume of said reaction liquid phase within said reaction zone in gallons, and u is the production rate from the reaction zone in gallons per minute.

13. The method defined in claim 1 wherein said urea, sulfuric acid and water are continuously added simultaneously to said reaction vessel at a combined rate equivalent to a predetermined production rate, product solution of said predetermined composition is continuously removed from said reaction zone at said predetermined production rate, and the volume of said reacting liquid phase in said reaction zone corresponds to at least about one-half said predetermined production rate.

14. The method defined in claim 13 wherein said predetermined composition has a predetermined crystallization temperature of about 80° or less, and the feed rates of said urea, sulfuric acid and water to said reaction vessel are continuously controlled within predetermined limits sufficient to maintain the concentration of each of said urea, sulfuric acid and water in said product solution within 2 weight percent of their predetermined concentrations and to maintain the crystallization temperature of said product solution within 10° F. of said predetermined crystallization temperature.

15. The method defined in claim 1 wherein the weight ratio of said sulfuric acid to said urea in said product solution is at least about one, said product solution comprises 0 to about 25 weight percent water, said urea and said sulfuric acid, in combination, constitute at least about 75 weight percent of said product solution, and said product solution is free of reaction by-products resulting from the decomposition of a member selected from the group consisting of said urea, said sulfuric acid, and combinations thereof.

16. The method defined i claim 1 wherein said cooling of said reacting liquid phase during the addition of said urea, acid and water, is achieved, at least in part, by directly contacting said reacting liquid phase with air.

17. A method for continuously producing concentrated, stable solutions of urea and sulfuric acid of predetermined composition which method comprises the steps of (i) continuously and simultaneously adding urea, sulfuric acid and water to a reacting liquid phase, hereinafter defined, in a reaction zone at relative rates corresponding to the concentration of each respective component in said predetermined composition and within the ranges of about 5 to about 75 weight percent urea, about 5 to 85 weight percent sulfuric acid, and 0 to about 35 weight percent water, in which said urea and sulfuric acid constitute at least about 65 weight percent of the feed to said reaction zone and are added separately to said reaction zone, (ii) admixing said urea, sulfuric acid and water in said reaction zone with a reacting liquid phase comprising urea, sulfuric acid, water and said reaction product of said predetermined composition, the quantity of said reacting liquid phase in said reaction zone corresponding to at least about one half the combined hourly addition rates of said urea, acid and water to said reaction zone and being sufficient to prevent the discharge of unreacted urea in the product from said reaction zone, (iii) agitating said reacting liquid phase continuously during the addition of said urea, sulfuric acid and water to rapidly disperse the same therein, (iv) cooling at least a portion of said reacting liquid phase by an amount sufficient to maintain the temperature of said reacting liquid phase at a level of about 120° F. to about 176° F., and below the incipient decomposition temperature of said predetermined composition, and (v) continuously withdrawing product solution of said predetermined composition from said reaction zone.

18. The method defined in claim 17 wherin (i) said urea is selected from the group consisting of prilled urea and granular urea, and combinations thereof, (ii) the volume of said reacting liquid phase in said reaction zone corresponds to at least about said combined hourly addition rate of said urea, sulfuric acid and water, (iii) said reacting liquid phase is maintained at a temperature below about 170° F., (iv) said concentrations of said urea, sulfuric acid and water in said predetermined composition are within the ranges of about 10 to about 70 weight percent urea, about 10 to about 80 percent sulfuric acid and about 0 to about 25 weight percent water, and (v) said urea and sulfuric acid constitute at least about 75 weight percent of said predetermined composition.

19. A composition of matter comprising about 5 to about 75 weight percent urea, about 5 to about 85 weight percent sulfuric acid, and about 0 to 35 weight percent water based on the combined weight of urea, sulfuric acid and water, and less than about 0.1 weight percent of a member selected from the group consisting of sulfamic acid, ammonium sulfamate, and combinations thereof, in which at least a portion of said urea and sulfuric acid are present as a member selected from the group consisting of monourea sulfate, diurea sulfate, and combinations thereof.

20. The composition defined in claim 19 comprising about 10 to about 70 weight percent urea, about 10 to about 80 weight percent sulfuric acid, and about 0 to about 25 weight percent water, wherein the weight ratio of sulfuric acid to urea is at least about 1.

21. The composition defined in claim 20 containing no detectable amount of a member selected from the group consisting of sulfamic acid, ammonium sulfamate and combinations thereof.

22. The composition defined in claim 19 containing less than about 0.05 weight percent of said member selected from the group consisting of sulfamic acid, ammonium sulfamate, and combinations thereof.

23. The composition defined in claim 19 containing no detectable amount of a member selected from the group consisting of sulfamic acid, ammonium sulfamate and combinations thereof.

24. The method of improving the quality of agricultural soils including the steps of applying to said soil an agronomically effective amount of the composition defined in claim 23.

25. The method of fertilizing crops including the steps of applying to said crop an agronomically effective amount of the composition defined in claim 23.

26. The method defined in claim 25 wherein said composition is applied to said crop at a rate equivalent to a nitrogen dosage of at least about 40 lbs. of nitrogen per acre of said crop.

27. A method for producing concentrated solutions of urea and sulfuric acid of predetermined composition, which method comprises the steps of: (i) simultaneously adding urea, concentrated sulfuric acid, and optionally water, to a reaction zone at relative rates corresponding to the concentration of each respective component in said predetermined composition, and within the ranges of about 10 to about 70 weight percent urea, about 10 to about 80 weight percent sulfuric acid, and 0 to about 35 weight percent water, in which said urea and said sulfuric acid, in combination, constitute at least about 65 weight percent of the feed to said reaction zone and are introduced into said reaction zone separately of each other, and in which the weight ratio of said sulfuric acid to said urea is at least about 1, (ii) continuously agitating the resulting liquid phase in said reaction zone during the addition of said urea, acid, and optionally water, to rapidly disperse said urea, acid, and water therein, (iii) cooling said liquid phase during said addition of said urea, acid, and water, by an amount sufficient to maintain said liquid phase at a temperature of about 176° F. or less, and below the incipient decomposition temperature of said predetermined composition, and (iv) recovering from said reaction zone a product solution having said predetermined composition free of reaction by-products resulting from the decomposition of a member selected from the group consisting of urea, sulfuric acid, and combinations thereof.

28. The method defined in claim 27 wherein said product solution comprises 0 to about 25 weight percent water, said urea and said sulfuric acid, in combination, constitute at least about 75 weight percent of said product solution, and said product solution is free of reaction by-products resulting from the decomposition of said urea.

29. A composition of matter comprising the reaction product of urea and sulfuric acid, which composition contains 0 to about 35 weight percent water, about 10 to about 80 weight percent sulfuric acid, and about 10 to about 70 weight percent urea, wherein said urea and said sulfuric acid, in combination, constitute at least about 65 weight percent of said composition, the weight ratio of said sulfuric acid to said urea is at least about one, and wherein said composition is free of urea-sulfuric acid reaction by-products resulting from the decomposition of a member selected from the group consisting of urea, sulfuric acid, and combinations thereof.

30. The composition defined in claim 29 comprising 0 to about 25 weight percent water, wherein said urea and said sulfuric acid, in combination, constitute at least about 75 weight percent of said composition, and said composition is free of reaction by-products resulting from the decomposition of said urea.

31. A composition of matter comprising the reaction product of urea and sulfuric acid, about 10 to about 80 weight percent sulfuric acid, and which composition contains 0 to about 35 weight percent water, about 10 to about 70 weight percent urea, wherein said urea and said sulfuric acid, in combination, constitute at least about 65 weight percent of said composition, and wherein said composition is free of urea-sulfuric acid reaction by-products resulting from the decomposition of a member selected from the group consisting of urea, sulfuric acid and combinations thereof.

32. The composition defined in claim 31 comprising 0 to about 25 weight percent water, wherein said urea and said sulfuric acid, in combination, constitute at least about 75 weight percent of said composition, and said composition is free of reaction by-products resulting from the decomposition of said urea.

33. The method defined in claim 1 wherein said product solution recovered from said reaction zone is free of decomposition products of urea, sulfuric acid, and combinations therof formed by the reaction of said urea and said sulfuric acid in said reactio zone.

34. A composition of matter formed by the reaction of urea and sulfuric acid to convert at least a portion of said urea and sulfuric acid to a member selected from the group consisting of the monourea adduct of sulfuric acid, the diurea adduct of sulfuric acid, and combinations thereof, which composition comprises 0 to about 35 weight percent water, about 10 to about 80 weight percent sulfuric acid, and about 10 to about 70 weight percent urea, wherein said urea and sulfuric acid, in combination, constitute at least about 65 weight percent of said composition, and wherein said composition is free of decomposition products of urea, sulfuric acid, and combinations thereof, formed by said reaction of said urea and sulfuric acid.

35. The composition of matter produced by the method which comprises the steps of reacting urea, sulfuric acid, and optionally water, in proportions within the ranges of about 10 to about 70 weight percent urea, about 10 to about 80 weight percent sulfuric acid, and 0 to about 35 weight percent water, in which said urea and said sulfuric acid, in combination, constitute at least about 65 weight percent of the combination of said urea, sulfuric acid, and water, and maintaining the temperature of said combination of said urea, sulfuric acid and water below its incipient decomposition temperature.

36. The composition defined in claim 35 wherein the temperature of said combination of said urea, sulfuric acid, and water, is maintained below 176° F.

37. The method defined in claim 35 wherein the temperature of said combination of said urea, sulfuric acid, and water, is maintained below about 160° F.

38. The composition defined in claim 35 wherein the temperature of said combination of said urea, sulfuric acid, and water, is maintained below about 155° F., and the weight ratio of said urea to said sulfuric acid is at least about 1.

39. A method for producing reaction products of urea and sulfuric acid, which method comprises the steps of combining urea, sulfuric acid, and optionally water, in proportions corresponding to about 10 to about 70 weight percent urea, about 10 to about 80 weight percent sulfuric acid, and 0 to about 35 weight percent water, wherein said urea and said sulfuric acid, in combination, constitute at least about 65 weight percent of said reaction product, reacting said urea with said sulfuric acid in said combination to produce said reaction products, and, at all times during said reaction, maintaining the temperature of said combination at a level below the incipient decomposition temperature of said combination.

40. The method defined in claim 39 wherein said temperature of said combination is maintained at a level below about 176° F.

41. The method defined in claim 39 wherein said temperature of said combination is, at all times during reaction, maintained at a temperature below about 160° F.

42. The method defined in claim 39 wherein said temperature is maintained at a level of about 155° F. or less and the weight ratio of said urea to said sulfuric acid in said combination is at least about 1.

43. The method of improving the quality of agricultural soils including the step of applying to said soil an agronomically effective amount of the composition defined in claim 29.

44. The method of fertilizing crops including the step of applying to said crop an agronomically effective amount of the composition defined in claim 29.

45. The method of improving the quality of agricultural soils including the step of applying to said soil an agronomically effective amount of the composition defined in claim 31.

46. The method of fertilizing crops including the step of applying to said crop an agronomically effective amount of the composition defined in claim 31.

47. The method of improving the quality of agricultural soils including the step of applying to said soil an agronomically effective amount of the composition defined in claim 34.

48. The mehtod of fertilizing crops including the step of applying to said crop an agronomically effective amount of the composition defined in claim 34.

49. The method of improving the quality of agricultural soils including the step of applying to said soil an agronomically effective amount of the composition defined in claim 35.

50. The method of fertilizing crops including the step of applying to said crop an agronomically effective amount of the composition defined in claim 35.

51. The method of improving the quality of agricultural soils including the step of applying to said soil an agronomically effective amount of the composition defined in claim 36.

52. The method of fertilizing crops including the step of applying to said crop an agronomically effective amount of the composition defined in claim 36.

* * * * *